United States Patent [19]

Baetz

[11] Patent Number: 5,424,109
[45] Date of Patent: Jun. 13, 1995

[54] HYBRID DUAL FIBER MATRIX DENSIFIED STRUCTURE AND METHOD FOR MAKING SAME

[75] Inventor: Jay G. Baetz, Vienna, Va.

[73] Assignee: Atlantic Research Corporation, Alexandria, Va.

[21] Appl. No.: 639,193

[22] Filed: Aug. 9, 1984

[51] Int. Cl.⁶ .............................................. B32B 5/12
[52] U.S. Cl. ..................................... 428/113; 428/549; 428/301
[58] Field of Search ............... 428/549, 554, 548, 902, 428/113, 301; 427/160

[56] References Cited

U.S. PATENT DOCUMENTS

| | | | |
|---|---|---|---|
| 4,064,305 | 12/1977 | Wallin | 428/902 X |
| 4,410,394 | 10/1983 | Stalcup | 428/912.2 X |
| 4,435,455 | 3/1984 | Prewo et al. | 428/902 X |
| 4,467,838 | 8/1984 | Rheaume | 428/902 X |
| 4,485,179 | 11/1984 | Brennan et al. | 428/902 X |
| 4,507,354 | 3/1985 | Ishikawa et al. | 428/902 X |

*Primary Examiner*—Peter A. Nelson
*Attorney, Agent, or Firm*—Lowe, Price, LeBlanc & Becker

[57] ABSTRACT

A high strength structure is formed of an inner layer of one material fibers and an interbraided outer layer of second material fibers so that there is a hybrid dual fiber interface or zone, and the layers are then separately sequentially densified with compositions by chemical vapor deposition to provide a tailored, highly oxidative resistant interior with a high strength exterior. The inner fibers may be silicon carbide while the outer fibers are graphite, and the inner densification compositions are carbides, nitrides and carbon, with the outer densification compositions being silicon carbide or graphite. The structure is useful for combustion chambers, engine components and high pressure corrosive chemical vessels.

10 Claims, 4 Drawing Sheets

HYBRID DUAL FIBER MATRIX DENSIFIED STRUCTURE AND METHOD FOR MAKING SAME

FIELD OF THE INVENTION

This invention relates to high strength structures, particularly ceramic and graphite fiber structures.

BACKGROUND AND DISCUSSION OF THE PRIOR ART

Heretofore it was known to make structures of various types of carbon fibers and composite materials.

U.S. Pat. No. 4,182,495, granted to Borgmeier et al. discloses a method of construction using graphite or carbon fiber preimpregnated tape having a low temperature cure epoxy resin system. U.S. Pat. No. 4,373,006 to Galasso et al. discloses composite materials containing silicon carbide coated fibers.

U.S. Pat. No. 3,853,506 and U.S. Pat. No. 3,900,675 to Olcott, and U.S. Pat. No. 3,980,105 to Myskowski disclose structures utilizing pyrolytic graphite. While U.S. Pat. No. 4,397,901 to Warren is directed to a method of making a composite article comprising a carbon fibrous substrate, including a pyrolytic carbon sheath formed about each fiber of the substrate, a metallic carbide, oxide or nitride coating over the coated fibers of the substrate, and an impermeable metallic carbide, oxide or nitride outer protective layer.

Woven composite articles are disclosed in O'Brien et al., U.S. Pat. No. 4,063,684; Fukuta et al., U.S. Pat. No. 4,336,296; and Maistre, U.S. Pat. No. 4,366,658.

One major problem associated with the prior art structures was to provide a highly corrosion or oxidation resistant structure while providing a lightweight, high strength structure.

It is therefore a principal object of the present invention to provide a high strength structure which is lightweight, and yet has a corrosion or oxidation resistant interior, and to a method for forming same.

It is another object of the present invention to provide a structure as aforesaid which is useful in a broad number of heavy duty intensive environment applications.

The aforesaid as well as other objects and advantages will become apparent from a reading of the following description, the adjoined claims and the accompanying drawings, described below.

SUMMARY OF THE INVENTION

A high strength structure formed of an inner layer of one material fiber and an outer layer of another material fiber with a hybrid intermediate layer of both of the fibers, with a first composition densification of the outer layer and second composition densification of the inner layer to achieve an oxidative resistant, high strength structure. The different refractory ceramic and carbon material fibers, and densifying compositions complement this design, such as the chemical vapor deposition (CVD) of pyrolytic graphite matrix into the outer layer and a refractory carbide matrix into the inner structure.

DESCRIPTION OF THE PREFERRED EMBODIMENTS

Figure 1:
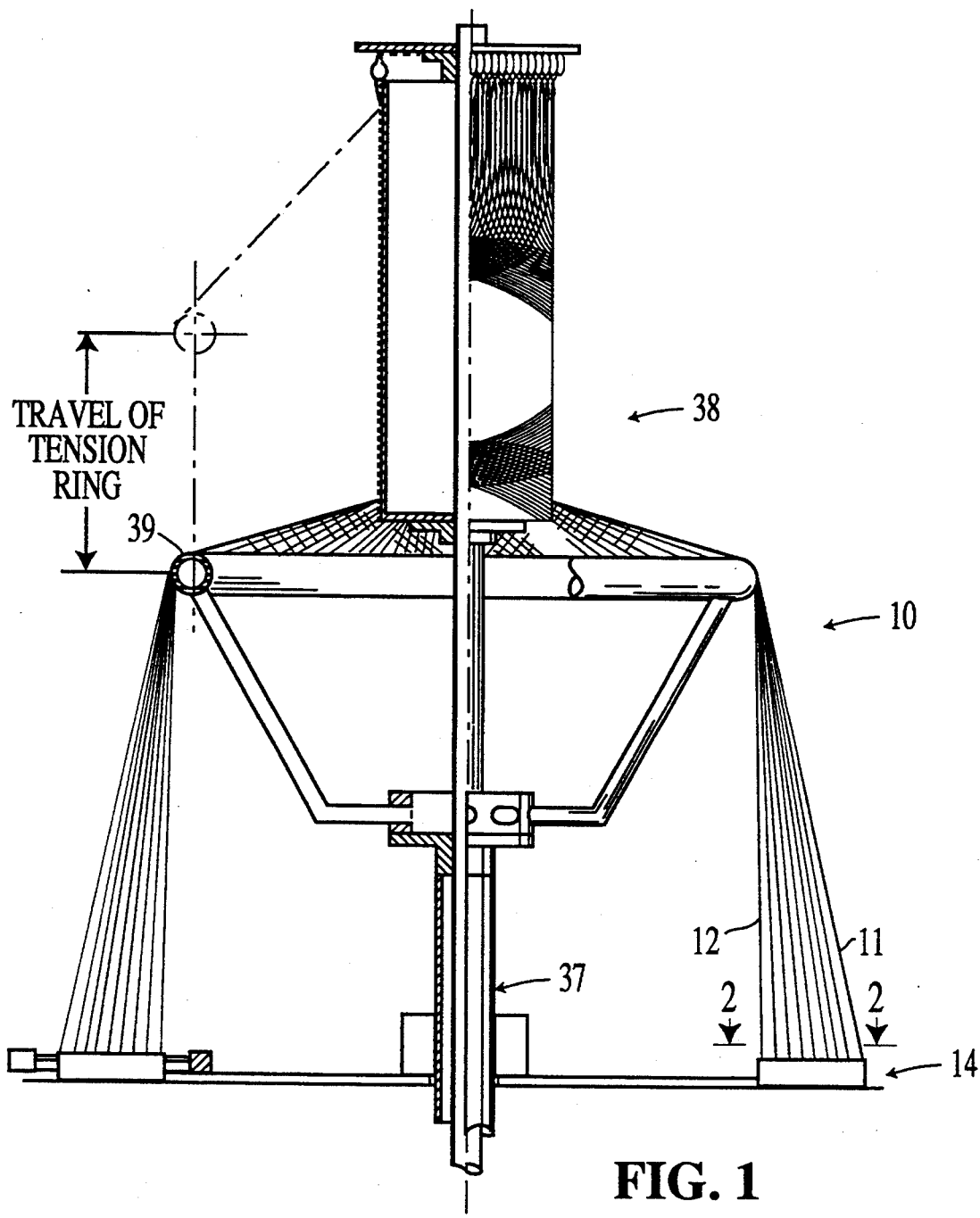
FIG. 1 is a front elevational partial sectional and schematic view of the braiding apparatus and operation of the present invention.
Figure 2:
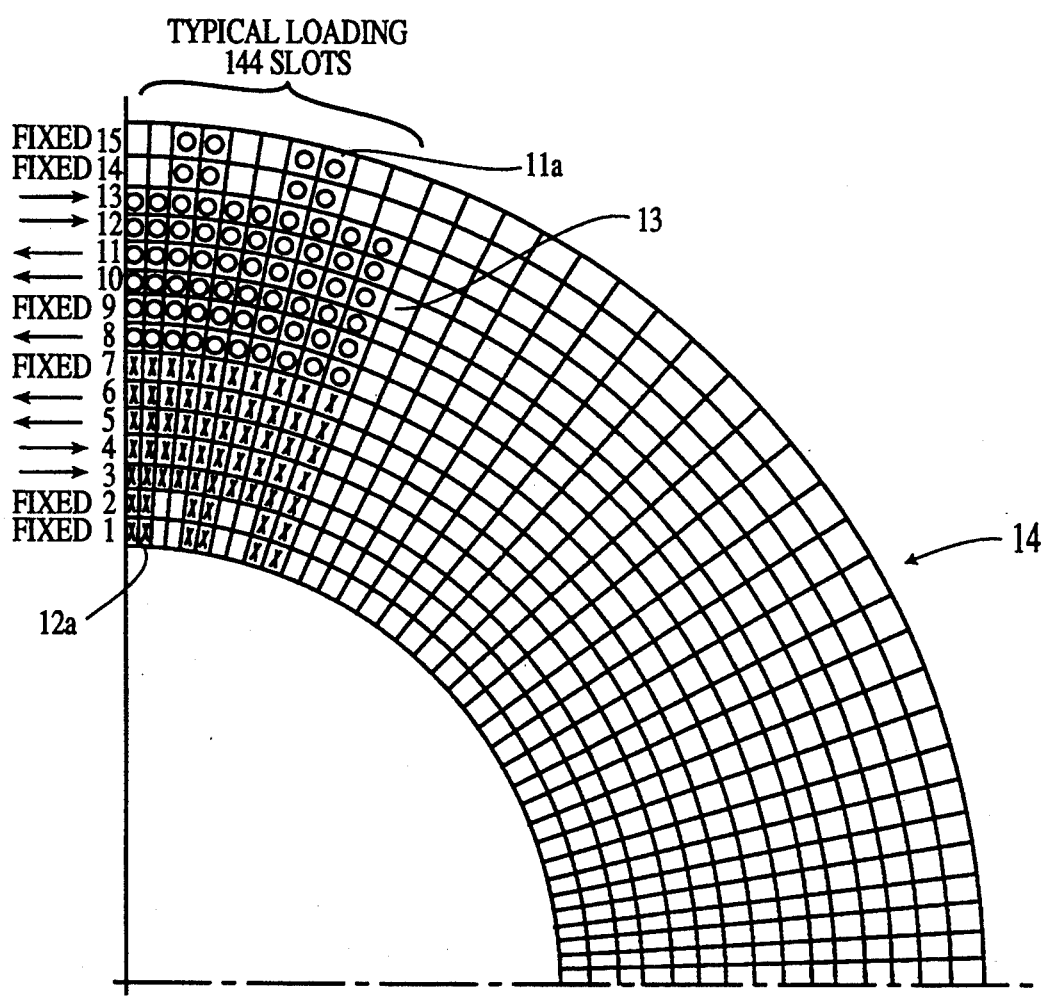
FIG. 2 is a partial sectional schematic view taken substantially along line 2—2 of FIG. 1.
Figure 3A:
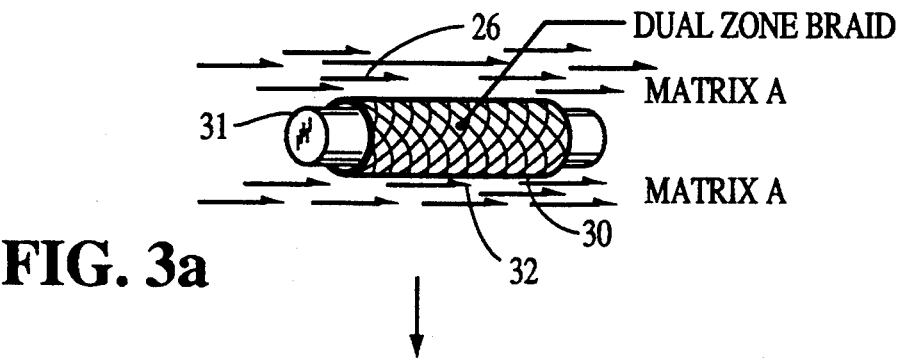
FIGS. 3a-3e are illustrative views of the several steps in performing the method of the present invention.
Figure 3B:
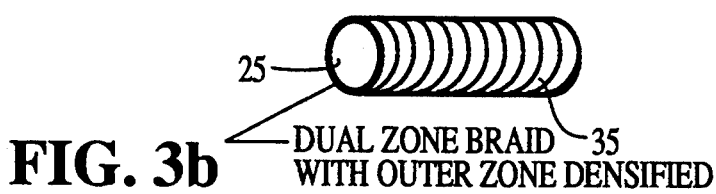
Figure 3C:
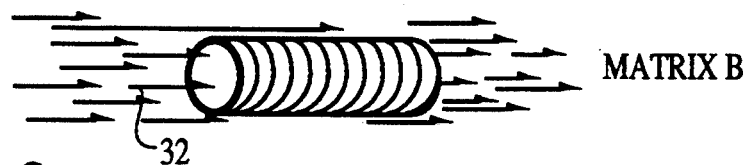
Figure 3D:
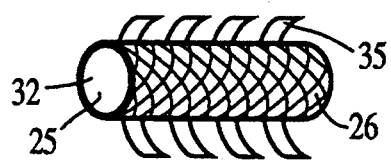
Figure 3E:
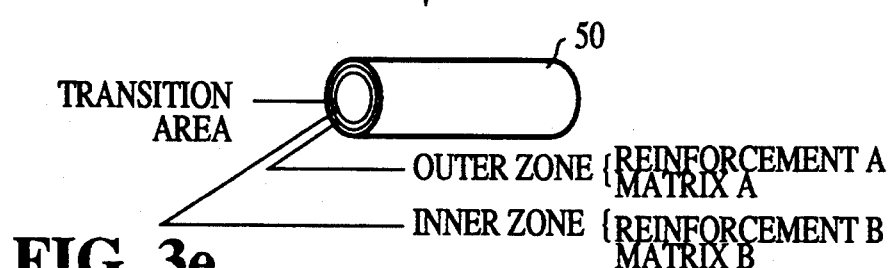

Referring to FIGS. 1 and 2, there is shown the novel zone controlled braiding of graphite and silicon carbide fibers in a simultaneous process. This process provides an effective hybrid zoned preform that can be produced on the circular braider 10. Circular braider 10 may be of the type as shown and described in U.S. Pat. No. 3,426,804, granted to Bluck, which disclosure is incorporated herein by reference thereto. The well known circular braider is modified to the extent as set forth in the following description.

Circular braider 10 is formed with braider bed 14, telescoping screw jack 37, braiding section 38 and tension ring 39. Circular braider 10 is specifically modified with respect to braider bed 14, in that bed 14 contains spools 11a and 12a for feeding graphite fiber 11 and silicon carbide fiber 12 respectively. In one aspect the graphite fiber 11/silicon carbide fiber 12 distribution may be 50/50 and that all 15 rows 13 of the braider bed 14 will be utilized. Thinning of the structure by using fewer rows of fibers on either side of the central boundary will not alter the hybrid zoned structure objective.

FIG. 2 presents the preliminary loading and braiding pattern. The numbered circular rows (1 thru 15) and radial slots for one quadrant (1 through 36) represent positions in which fiber carriers (spools) can be mounted. The circles in the outboard positions represent graphite fibers and the "X's" represent silicon carbide fibers. The loading is staggered in the radial direction of pairs of rows—slots 1 and 2 being loaded to the inboard boundary and slots 3 and 4 to the outboard boundary. The boundaries are formed by two fixed (immobile) circular rows consistent with the plan to perform braiding steps in a 2×2 pattern. These boundary rows will receive fiber carriers during radial shifts. The received carriers reside in the boundary rows during the subsequent reverse rotational shift of the delivery rows. Upon reentering the delivery rows they then proceed in the circular direction in which they were delivered.

This hybrid cylinder loading is designed to form a medial boundary which blocks migration of graphite into silicon carbide and vice versa while assuring interlacing of these two fiber types at the interface. A computer program which models the spool motion was used to evaluate candidate braiding patterns. This program was utilized to assess several candidates for the hybrid preform until the figure plan was validated as providing an effective medial boundary with good interaction at the interface. As FIG. 2 illustrates, circular rows 7 and 9 have been immobilized, and one active row has been retained between these boundary rows. It should also be noted that the remaining mobile circular rows are shifted in pairs as indicated by the arrows. Inputting this layout and 2×2 shift plan into the computer program, the program verified that all positions performed in a repetitive manner (i.e., after some number of moves, each fiber returns to its starting position).

The next major consideration after the hybrid carbon-silicon carbide preform has been created, is the method for turning the preform skeleton 30 into a useable composite. Conventional chemical vapor deposition/infiltration (CVD/CVI) has been selected as the approach which can achieve the desired structure. The inside surface will be infiltrated with a refractory carbide to create the tough oxidation resistant flamefront wall 25. Both silicon carbide and hafnium carbide are preferred. The outer structure wall will be infiltrated with preferably either pyrolytic graphite (PG) or SiC 26. In either case, "Coke bottling", or the density gradient effect, which has been the major drawback of infiltration densification by CVD/CVI, is now used advantageously in the present invention to achieve a desired densification.

Referring now to FIGS. 3a-3e, the hybrid zone braiding is accomplished on a male graphite mandrel 31. The reinforcement preform 30 and mandrel 31 are then positioned in a CVD furnace (not shown) and infiltrated with carbon 32. The process results in "Coke bottling", whereby the interior pores tend to be closed off as the carbon closes off the pore entrances. This phenomenon results in a density gradient through the thickness of the structure which has plagued the rocket nozzle community. In this case, the phenomenon, while undesirable in the prior art, is a key to achieving the present invention. Since the graphite mandrel or mask 31 prevents CVD carbon densification from the inside, the carbon infiltrates from the outside diameter (O.D.) only. As the self-perpetuating "Coke bottling" takes place, we develop a gradient of 100% densification at the O.D. to 0% at the inside diameter (I.D.). See FIG. 4a which graphically illustrates the density gradient after the step of FIG. 3a. The CVD rates and times are determined experimentally for each proposed geometry. Silicon carbide can be substituted for the carbon in CVD with similar densification gradient results.

Figure 4A:
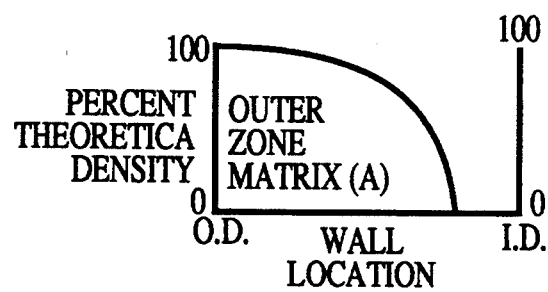
FIG. 4a is a graph of the density through the wall from the outside toward the inside after step (1)
Figure 4B:
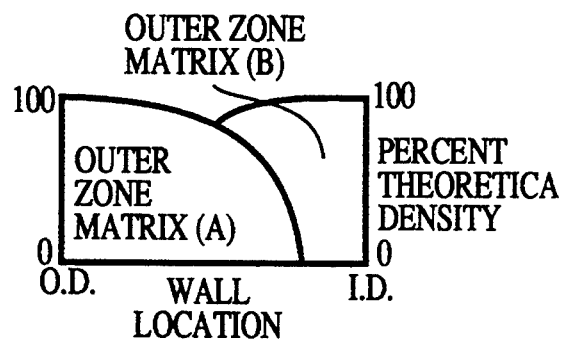
FIG. 4b is a graph of the density across the composite wall of the inner and outer layers after step (3).

The partially densified structure is removed from the furnace, and the graphite mandrel 31 removed from the inside diameter (I.D.). The outside diameter is skim cut and overwrapped with graphite cloth or mask 35 to protect it from the next process step. The part is returned to the CVD furnace and infiltrated with one of the refractory carbides 22, such as silicon carbide 26 or hafnium carbide, depending on the service temperature requirements. The same gradient is developed, but from the inside diameter out in this case. FIG. 4b shows the idealized density of the finished structure. FIGS. 4a and 4b demonstrate how the prior art's undesirable "Coke bottling" effect is utilized in the present invention to achieve a positive result. It is to be borne in mind that the prior art directed one to CVD without maskings. The densified structure is removed from the furnace, and the protective overwrap 35 removed. This inside diameter should be net. Conventional finishing techniques may then be employed to finish the structure 50. (See FIG. 3e)

It should be noted that there are a multitude of equivalents in reinforcement compositions and reinforcement composition combinations which could be employed. In like manner, several matrices, all through CVD can be used.

A partial tabulation of useful combinations of fibers and CVD matrices is given below.

|  | Reinforcement | CVD Matrix |
|---|---|---|
| Inside Zone | Silicon Carbide<br>Various Types<br>Carbon (Graphite)<br>Rayon<br>PITCH<br>PAN | Silicon Carbide<br>Hafnium Carbide<br>Other Carbides<br>Nitrides<br>Pyrolytic Carbon |
| Outside Zone | Carbon (Graphite) | Silicon Carbide<br>Pyrolytic Graphite<br>(Carbide) |

Important aspects of the present invention include (1) the hybrid character of the reinforcement and (2) the processing steps to achieve high levels of oxidation resistance on the inside of the structure with high strength on the outside of the structure, while minimizing the thickness and weight of the structure. The finished structure may be employed in a broad range of uses including combustion chambers, engine components and high pressure, corrosive chemical vessels.

It will be understood, therefore, that various changes and modifications may be made in the embodiments described without departing from the invention as defined in the appended claims, and it is intended, therefore, that all matter contained in the foregoing description shall be interpreted as illustrative only and not as limitative of the invention.

What is claimed is:

1. A high strength structure comprising an inner portion comprising interlaced flexible fibers formed of a first material selected from silicon carbide and graphite, and an outer portion comprising interlaced flexible fibers formed of a second material, said second material being carbon, said first and second fibers being interlaced to each other between the inner and outer portions, said first material fibers being infiltrated with a first composition selected from carbide, nitride and carbon, and said second material fibers being infiltrated with a second composition selected from silicon carbide and pyrolytic graphite.

2. The structure of claim 1, wherein the inner material fibers are oxidation resistant.

3. The structure of claim 1, wherein the outer material fibers are of higher strength than the inner material fibers.

4. The structure of claim 1, wherein the inner material fibers are oxidation resistant and wherein the outer material fibers are of higher strength than the inner material fibers.

5. The structure of claim 4, said first composition carbide being one selected from silicon carbide and hafnium carbide.

6. A method for forming a high strength structure comprising:
(a) braiding an inner layer of fibers comprising a first material selected from silicon carbide and graphite,
(b) braiding an outer layer of fibers comprising a second material formed of carbon interlaced to said first layer to form a preform;
(c) impregnating the outer layer with a first composition selected from carbide, nitride and carbon to densify the outer layer; and
(d) impregnating the inner layer with a second composition selected from silicon carbide and pyrolyitc graphite to densify the inner layer.

7. The method of claim 6, said steps (a)-(c) being performed wherein the preform is disposed on a mandrel.

8. The method of claim 7, further comprising removing the mandrel after step (c), and providing a protective overwrap to the outside of said outer layer.

9. The method of claim 6, wherein the inner material fibers are oxidation resistant and wherein the outer material fibers are of higher strength than the inner material fibers.

10. The method of claim 9, said first composition carbide being one selected from silicon carbide and hafnium carbide.

* * * * *